(12) United States Patent
Umehara

(10) Patent No.: US 10,803,572 B2
(45) Date of Patent: Oct. 13, 2020

(54) APPEARANCE INSPECTION APPARATUS AND APPEARANCE INSPECTION METHOD

(71) Applicant: JTEKT CORPORATION, Osaka-shi, Osaka (JP)

(72) Inventor: Jiro Umehara, Toyonaka (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/666,218

(22) Filed: Aug. 1, 2017

(65) Prior Publication Data

US 2018/0047152 A1 Feb. 15, 2018

(30) Foreign Application Priority Data

Aug. 9, 2016 (JP) ................................. 2016-156461

(51) Int. Cl.
| | |
|---|---|
| *H04N 5/232* | (2006.01) |
| *G06T 7/00* | (2017.01) |
| *G01N 21/88* | (2006.01) |
| *H04N 5/225* | (2006.01) |

(52) U.S. Cl.
CPC ....... *G06T 7/0004* (2013.01); *G01N 21/8806* (2013.01); *H04N 5/23296* (2013.01); *G01N 2021/8822* (2013.01); *G06T 2207/30164* (2013.01); *H04N 5/2256* (2013.01)

(58) Field of Classification Search
CPC ........ G01N 2021/8822; G01N 21/8806; G06T 2207/30164; G06T 7/0004
See application file for complete search history.

(56) References Cited

U.S. PATENT DOCUMENTS

| | | |
|---|---|---|
| 2,560,200 A | 7/1951 | Werzyn |
| 3,187,170 A | 6/1965 | Kille |
| 3,893,145 A | 7/1975 | King |
| 3,970,835 A | 7/1976 | Crete |
| 4,051,493 A | 9/1977 | Nakagawa et al. |
| 4,078,170 A | 3/1978 | Sloop |
| 4,081,814 A | 3/1978 | Bulland |

(Continued)

FOREIGN PATENT DOCUMENTS

| | | |
|---|---|---|
| JP | H08-114553 A | 5/1996 |
| JP | 2002-116153 A | 4/2002 |

(Continued)

OTHER PUBLICATIONS

Mar. 28, 2018 Office Action issued in U.S. Appl. No. 15/499,123.

(Continued)

*Primary Examiner* — Md N Haque
(74) *Attorney, Agent, or Firm* — Oliff PLC

(57) ABSTRACT

An appearance inspection apparatus radiates light from a light source to a flat inspection surface of an object to be inspected as diffused light with an illumination device, and photographs the inspection surface with a camera. The camera and the light source are arranged in a positional relationship that satisfies $\theta \neq \alpha$ at any positions on the inspection surface, where $\theta$ represents an angle formed between a straight line connecting an arbitrary position on the inspection surface to the camera and a line perpendicular to the inspection surface at that position, and $\alpha$ represents an incident angle of the diffused light.

5 Claims, 9 Drawing Sheets

(56) References Cited

U.S. PATENT DOCUMENTS

| | | | |
|---|---|---|---|
| 4,091,402 | A | 5/1978 | Siegel |
| 4,241,988 | A | 12/1980 | Lepp |
| 4,259,000 | A | 3/1981 | Heredia |
| 4,512,644 | A | 4/1985 | Yoshida |
| 4,710,005 | A | 12/1987 | Bennett |
| 4,731,649 | A | 3/1988 | Chang et al. |
| 4,752,794 | A | 6/1988 | Bohannon |
| 5,194,885 | A | 3/1993 | Spencer |
| 5,275,364 | A | 1/1994 | Burger et al. |
| 5,592,286 | A | 1/1997 | Fedor |
| 5,761,550 | A | 6/1998 | Kancigor |
| 6,042,277 | A | 3/2000 | Errington |
| 6,384,863 | B1 | 5/2002 | Bronson |
| 7,957,636 | B2 | 6/2011 | Saitoh et al. |
| 8,736,710 | B2 | 5/2014 | Spielberg |
| 2001/0012393 | A1* | 8/2001 | Yonezawa .......... G01N 21/8803 382/145 |
| 2004/0184031 | A1 | 9/2004 | Vook et al. |
| 2005/0025353 | A1* | 2/2005 | Kaneko ................ G06T 7/0004 382/152 |
| 2010/0238284 | A1* | 9/2010 | Akao ..................... G01B 11/26 348/135 |
| 2010/0296096 | A1* | 11/2010 | Horvath ............. G01B 11/0625 356/446 |
| 2013/0128026 | A1* | 5/2013 | Hirose ............... G01N 21/8903 348/125 |

FOREIGN PATENT DOCUMENTS

| | | | |
|---|---|---|---|
| JP | 2002116153 | * | 4/2002 |
| JP | 2010197252 | * | 9/2010 |

OTHER PUBLICATIONS

U.S. Appl. No. 15/499,123, filed Apr. 27, 2017 in the name of Jiro Umehara.

U.S. Appl. No. 15/669,527, filed Aug. 4, 2017 in the name of Jiro Umehara.

Jul. 23, 2020 Office Action issued in Japanese Patent Application No. 2016-156461.

* cited by examiner

APPEARANCE INSPECTION APPARATUS AND APPEARANCE INSPECTION METHOD

INCORPORATION BY REFERENCE

The disclosure of Japanese Patent Application No. 2016-156461 filed on Aug. 9, 2016 including the specification, drawings and abstract, is incorporated herein by reference in its entirety.

BACKGROUND OF THE INVENTION

1. Field of the Invention

The present invention relates to an appearance inspection apparatus and an appearance inspection method.

2. Description of the Related Art

In general appearance inspection methods, whether any defect is present on an inspection surface is determined based on the color density of an image captured by imaging the inspection surface with a camera. For example, an image of a flaw that is present on the inspection surface is deep (dark) in color than that of a region without a flaw. Therefore, a region having a high color density in the captured image can be determined as a region with a flaw, and a region having a low color density in the captured image can be determined as a region without a flaw.

For example, Japanese Patent Application Publication No. 2002-116153 (JP 2002-116153 A) discloses an appearance inspection apparatus of FIG. 10 as an apparatus for inspecting the appearance of the end face of a cylindrical workpiece such as a bearing ring by the method described above. Referring to FIG. 10, in the appearance inspection apparatus of JP 2002-116153 A, light radiated from an illumination device 13 is reflected by the end face of an inner bearing ring that is an inspection surface 24, and the reflected light is captured by an imaging device 11 to form an image.

As illustrated in FIG. 10, general appearance inspection apparatuses have a camera mounted at a position where light that is specularly reflected by the inspection surface enters the camera. That is, a traveling direction of the light that is specularly reflected by the inspection surface is identical to a photographing direction of the camera. The light that enters the camera from the inspection surface includes light that is diffusely reflected by the inspection surface, and light that is specularly reflected by the inspection surface. Comparing the two types of light, the ratio of the intensity of the light that is specularly reflected to enter the camera is significantly higher. When the defect on the inspection surface is not major irregularities such as a flaw but relatively minor irregularities caused by a difference in surface roughness or the like, there is a small difference in the specularly reflected light between a region with a defect and a region without a defect. When the ratio of the intensity of the light that is specularly reflected by the inspection surface to enter the camera is significantly higher, the above-mentioned difference is significantly small relative to the total intensity of the light that enters the camera. Therefore, the difference in the color density of the captured image is small, which may decrease the detection accuracy for a defect that is present on the inspection surface.

SUMMARY OF THE INVENTION

It is one object of the present invention to provide an appearance inspection apparatus and an appearance inspection method in which the accuracy of appearance inspection can be improved.

An appearance inspection apparatus according to one aspect of the present invention has the following features in its structure. That is, the appearance inspection apparatus includes a photographing device configured to photograph a flat inspection surface of an object to be inspected, and an illumination device configured to radiate light from a light source to the inspection surface as diffused light. The photographing device and the light source are arranged in a first positional relationship that satisfies $\theta \neq \alpha$ at all positions on the inspection surface, where $\theta$ represents an angle formed between a straight line connecting an arbitrary position on the inspection surface to the photographing device and a line perpendicular to the inspection surface at the arbitrary position, and $\alpha$ represents an incident angle of the diffused light.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
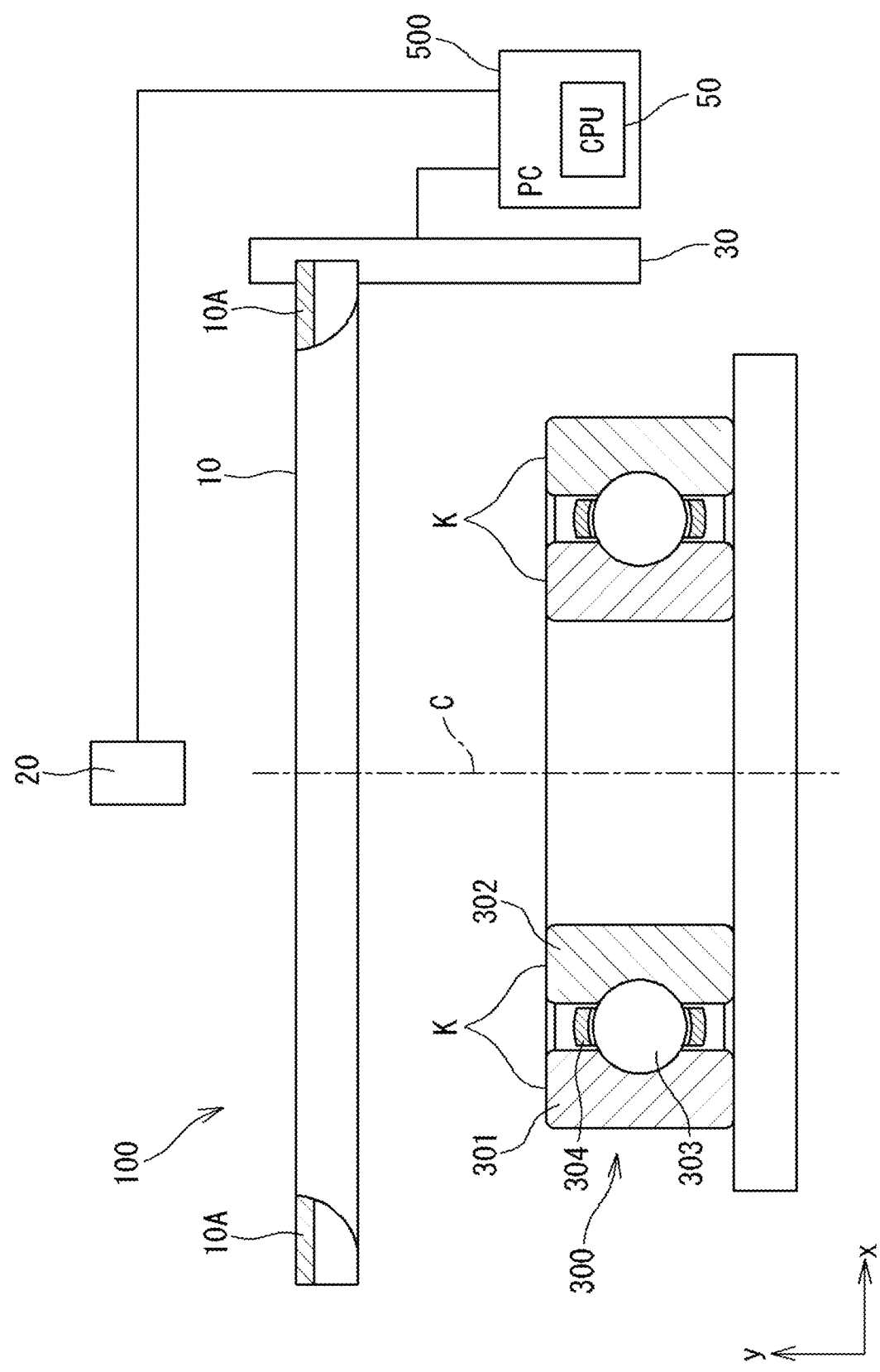
FIG. 1 is a schematic front view of an appearance inspection apparatus according to an embodiment.

Preferred embodiments are described below with reference to the drawings. In the following description, the same parts and constituent elements are denoted by the same reference symbols. The names and functions of those parts and constituent elements are also the same. Thus, description of those parts and constituent elements is not repeated.

A first embodiment is described below. An appearance inspection apparatus 100 according to this embodiment inspects the appearance of an industrial product having a high reflectance on its surface, that is, having gloss on its surface. An object to be inspected by the appearance inspection apparatus 100 is, for example, a rolling bearing. In the following description, the appearance inspection apparatus 100 inspects an inspection surface included in the end face of an outer ring and/or an inner ring of the rolling bearing, which is orthogonal to a rotation axis of the rolling bearing (hereinafter referred to simply as the end face). A rolling bearing 300 to be subjected to appearance inspection performed by the appearance inspection apparatus 100 includes an outer ring 301, an inner ring 302, a plurality of rolling elements 303, and a cage 304.

FIG. 1 is a schematic front view of the appearance inspection apparatus 100 according to this embodiment. Referring to FIG. 1, the appearance inspection apparatus 100 includes a light source 10A such as a light emitting diode (LED). The appearance inspection apparatus 100 includes an illumination device 10 and a camera 20. The illumination device 10 radiates light from the light source 10A to an inspection surface K included in the end face of each of the outer ring 301 and the inner ring 302 of the rolling bearing 300 that is the object to be inspected. The camera 20 is an example of a photographing device configured to capture an image of the inspection surface K.

The rolling bearing 300 is arranged so that a central axis C corresponding to the rotation axis is set in a vertical direction. A photographing direction of the camera 20 is set on a straight line including the central axis C, that is, vertically downward along the central axis C. The camera 20 is connected to a computer (personal computer (PC)) 500 serving as a controller, and inputs the captured image to the PC 500. The PC 500 includes a central processing unit (CPU) 50 for controlling the PC 500.

In the following description, the horizontal direction is defined as an x direction, and the right side in FIG. 1 is defined as a positive side of the x direction (referred to also as a +x side). The left side in FIG. 1 is defined as a negative side of the x direction (referred to also as a −x side). The vertical direction is defined as a y direction, and the upper side in FIG. 1 is defined as a positive side of the y direction (referred to also as a +y side). The lower side in FIG. 1 is defined as a negative side of the y direction (referred to also as a −y side).

The illumination device 10 radiates the light from the light source 10A to the inspection surface K as diffused light. For example, the light source 10A has a shape of a ring that is defined about a point included in the straight line including the central axis C, that is, a point located on the central axis C, and is included in a plane parallel to the end face of the rolling bearing 300. The illumination device 10 radiates the light from the light source 10A to the entire inspection surface K as diffused light having a low directivity by using a diffuser, a reflector, or the like (not illustrated). The light radiated by the illumination device 10 is preferably white light. With the white light, the difference of portions with defect and portions without defect is clearer than red, green, or blue light, and thus the detection accuracy for a defect can further be improved. In the following description, the illumination device 10 refers to a light emitting surface, that is, a radiation surface itself.

The illumination device 10 is moved in the y direction by a movement device 30. The movement device 30 includes, for example, a rail extending in the y direction, and a drive unit configured to raise or lower the illumination device 10 along the rail. The movement device 30 is connected to the PC 500, and is controlled by the PC 500 to move the illumination device 10. That is, the positional relationship between the light source 10A and the camera 20 changes relatively in accordance with the control performed by the PC 500.

The principle of inspection is described below. The appearance inspection apparatus 100 radiates diffused light to the inspection surface K with the illumination device 10. The appearance inspection apparatus 100 inspects the inspection surface K for a defect based on the intensity of light that is reflected by the inspection surface K to enter the camera 20. The defect on the inspection surface K that is inspected by the appearance inspection apparatus 100 is typified by, for example, the following defects (1) and (2). (1) The first defect is called a shoe mark, which is a difference in surface roughness that is caused by contact between a surface and foreign matter such as grinding swarf mostly in a surface grinding step of the manufacturing process. (2) The second defect is irregularities such as flaws (scratches, dents, or the like) caused by contact between a surface and an object after the manufacturing. Industrial products having gloss obtained by grinding or coating their surfaces have a high reflectance on their surfaces. The surface of the rolling bearing 300 is also ground, and therefore has a high reflectance. When the inspection surface K has a range with the above-mentioned defects and a range without the above-mentioned defects, there is a difference between the amounts of reflection from the respective ranges. By using the difference between the amounts of reflection, the appearance inspection apparatus 100 inspects the inspection surface K for a defect based on the amounts of reflection from the inspection surface K.

Figure 2:
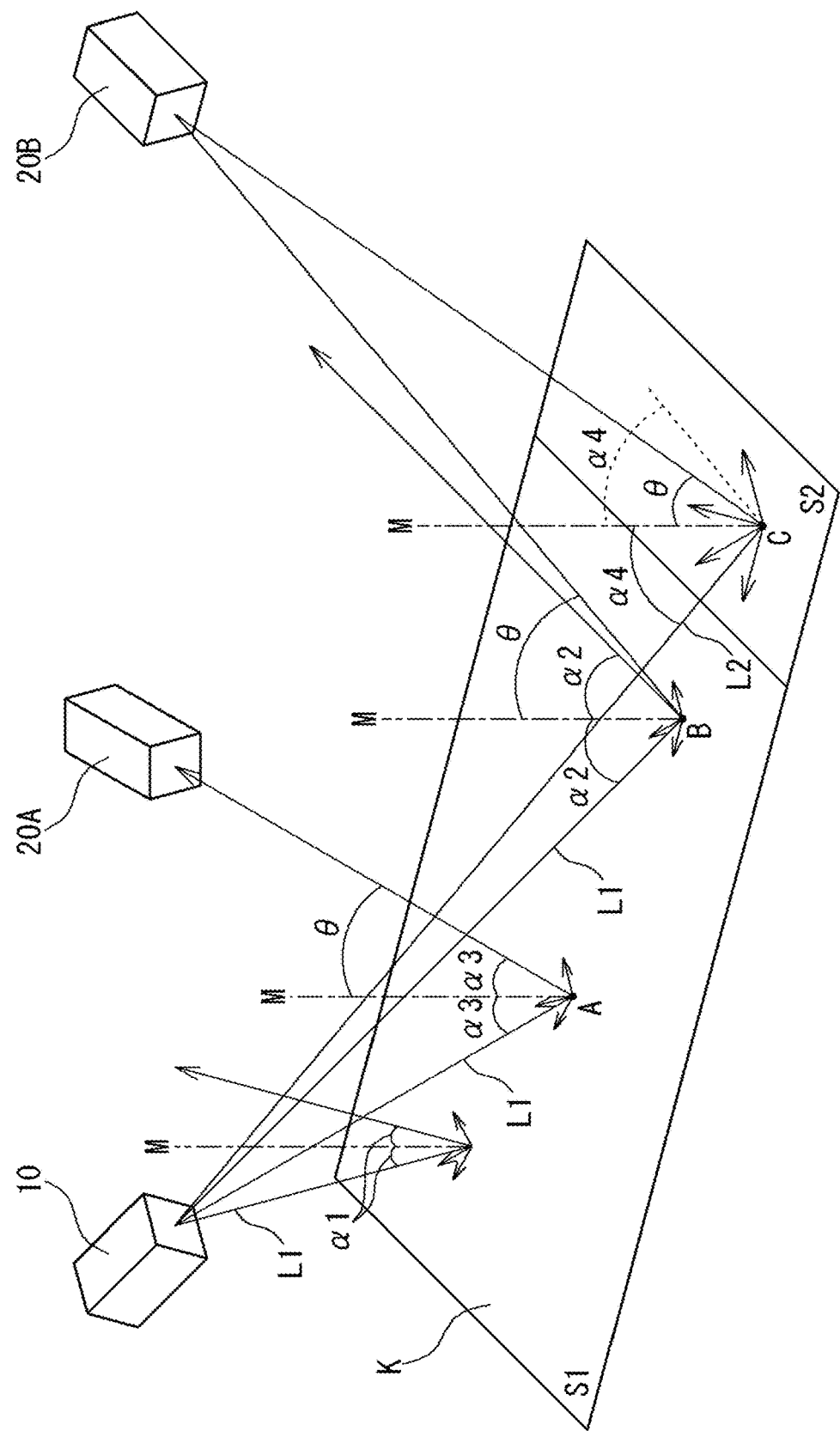
FIG. 2 is a schematic view for describing the principle of inspection to be performed by the appearance inspection apparatus.

Referring to FIG. 2, description is given of the principle of inspection to be performed by the appearance inspection apparatus 100 for the defect that is the difference in the surface roughness of the inspection surface. FIG. 2 is a view of the inspection surface K that is viewed obliquely from the top. The illumination device 10 and cameras 20A and 20B are arranged above the inspection surface K. The inspection surface K has a range S1 without a shoe mark and a range S2 with a shoe mark. In the range S2, the surface is ground in a state in which foreign matter such as grinding swarf is pressed against the surface. Therefore, the surface roughness of the range S1 is smaller than the surface roughness of the range S2. Thus, the intensity of light L1 that is radiated to the range S1 and is specularly reflected by the inspection surface K is higher than the intensity of light L2 that is radiated to the range S2 and is specularly reflected by the inspection surface K. In contrast, the intensity of the light L2 that is radiated to the range S2 and is diffusely reflected by the inspection surface K is higher than the intensity of the light L1 that is radiated to the range S1 and is diffusely reflected by the inspection surface K.

An angle $\theta$ is defined as an angle formed between a straight line connecting an arbitrary position on the inspection surface K to a central point (point on a photographing axis) of a lens (not illustrated) of the camera and a line M perpendicular to the inspection surface K at that position. When the camera is arranged in a direction in which an incident angle $\alpha$ of diffused light and the angle $\theta$ are equal to each other at a certain position on the inspection surface K ($\theta=\alpha$), light that is specularly reflected at that position enters the camera. Further, light that is diffusely reflected at other positions enters the camera.

In FIG. 2, the camera 20A is arranged in a direction in which light that is specularly reflected from any one of the positions on the inspection surface K (for example, a point A in FIG. 2) enters the camera 20A ($\theta=\alpha$). That is, the camera 20A and the light source of the illumination device 10 have a positional relationship that satisfies $\theta=\alpha$ at any one of the positions on the inspection surface K (second positional relationship). Light that is specularly reflected in the range S1, light that is diffusely reflected in the range S1, and light that is diffusely reflected in the range S2 enter the camera 20A. When the inspection surface K is a glossy surface, the ratio of the intensity of the light that is specularly reflected to enter the camera 20A is significantly higher than the ratio of the intensity of the light that is diffusely reflected to enter the camera 20A. Therefore, the difference in the intensity between the light that is diffusely reflected in the range S1 and the light that is diffusely reflected in the range S2 is significantly small relative to the total intensity of the reflected light that enters the camera 20A. Thus, it may be difficult to detect the difference in the surface roughness between the ranges S1 and S2, that is, the inspection surface K based on the difference in the light intensity.

In FIG. 2, the camera 20B is arranged in a direction in which light that is specularly reflected from any positions on the inspection surface K (for example, points B and C in FIG. 2) does not enter the camera 20B ($\theta \neq \alpha$). That is, the camera 20B and the light source of the illumination device 10 have a positional relationship that satisfies $\theta \neq \alpha$ at any positions on the inspection surface K (first positional relationship). Neither the light that is specularly reflected in the range S1 nor the light that is specularly reflected in the range S2 enters the camera 20B. Instead, the light that is diffusely reflected in the range S1 and the light that is diffusely reflected in the range S2 enter the camera 20B. Therefore, the difference in the intensity between the light that is diffusely reflected in the range S1 and the light that is diffusely reflected in the range S2 is large relative to the total intensity of the reflected light that enters the camera 20B. Thus, it is easy to detect the difference in the surface roughness between the ranges S1 and S2, that is, the inspection surface K based on the difference in the light intensity.

Figure 3:
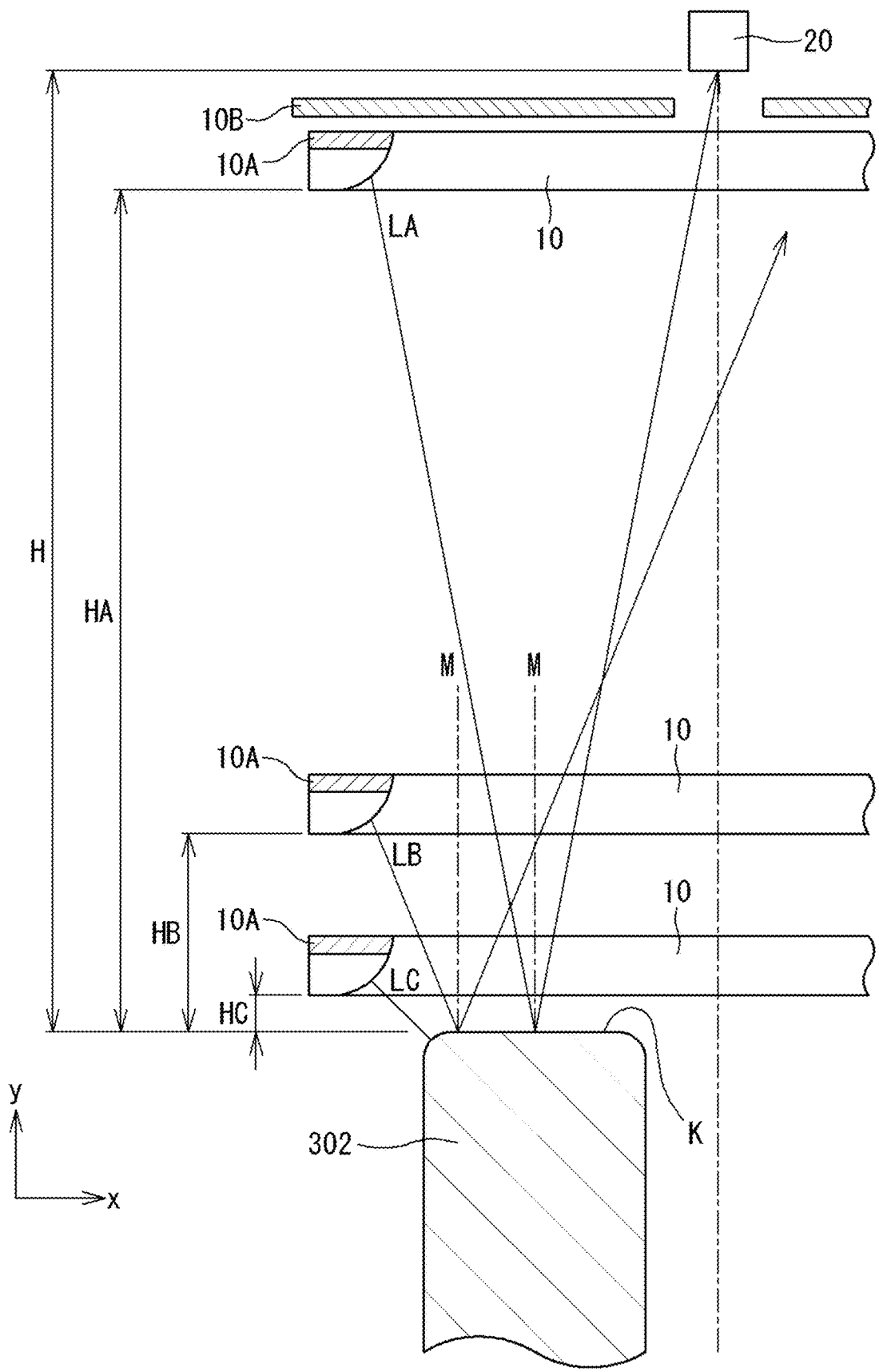
FIG. 3 is a schematic plan view illustrating a main part of the appearance inspection apparatus.

A positional relationship between the camera 20 and the illumination device 10 of the appearance inspection apparatus 100 is described with reference to FIG. 3. FIG. 3 is a schematic plan view illustrating a main part of the appearance inspection apparatus 100.

Referring to FIG. 3, the camera 20 is mounted at a height H from the inspection surface K. The illumination device 10 is mounted at a position of a height HB (first position) from the inspection surface K. The height HB is smaller than the height H (HB<H), and is a height at which the camera 20 and the light source 10A have the first positional relationship. Thus, the angle $\theta$ and the incident angle $\alpha$ of diffused light LB are not equal to each other at any positions on the inspection surface K (the range S1 without a shoe mark and the range S2 with a shoe mark) ($\theta \neq \alpha$). Therefore, the light LB that is diffused from the illumination device 10 and is specularly reflected by the inspection surface K does not enter the camera 20.

Figure 4:
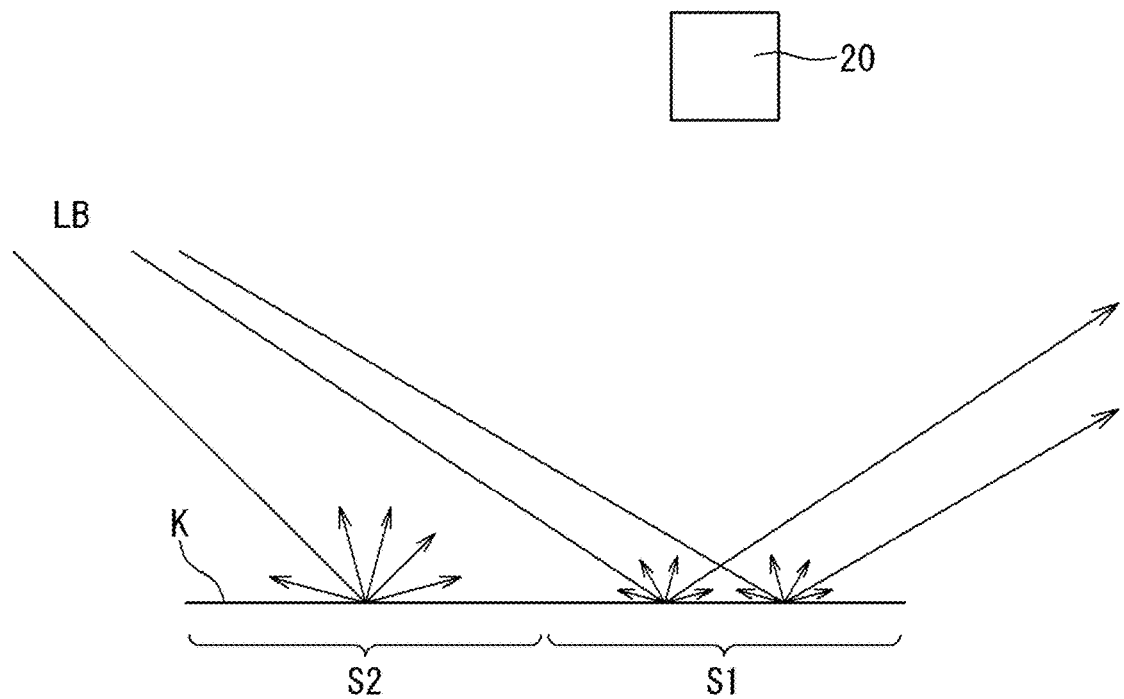
FIG. 4 is a view for describing appearance inspection to be performed by the appearance inspection apparatus with an illumination device arranged at a first position.

FIG. 4 is a view for describing appearance inspection to be performed with the illumination device 10 arranged at the first position. Referring to FIG. 4, the light LB that is diffused from the illumination device 10 located at the first position and is specularly reflected by the inspection surface K does not enter the camera 20, and the light LB that is diffused from the illumination device 10 located at the first position and is diffusely reflected by the inspection surface K enters the camera 20. By locating the illumination device 10 at the first position, the range S1 and the range S2 can be detected based on the difference in the intensity between the light that is diffusely reflected from the range S1 on the inspection surface K to enter the camera 20 and the light that is diffusely reflected from the range S2 on the inspection surface K to enter the camera 20. That is, the difference in the surface roughness of the inspection surface K (such as a shoe mark) can be detected.

The illumination device 10 is moved by the movement device 30 between the first position and a position of a height HA (second position) from the inspection surface K. The height HA is smaller than the height H and is larger than the height HB (HB<HA<H). The height HA is a height at which the camera 20 and the light source 10A have the second positional relationship. The distance between the second position and the inspection surface K is long, and therefore a reflector 10B is provided above the second position so as to compensate for the amount of light that reaches the inspection surface K. Thus, the angle $\theta$ and the incident angle $\alpha$ of diffused light LA are equal to each other at any one of the positions on the inspection surface K ($\theta = \alpha$). Therefore, the light LA that is diffused from the illumination device 10 and is specularly reflected by the inspection surface K enters the camera 20.

Figure 5:
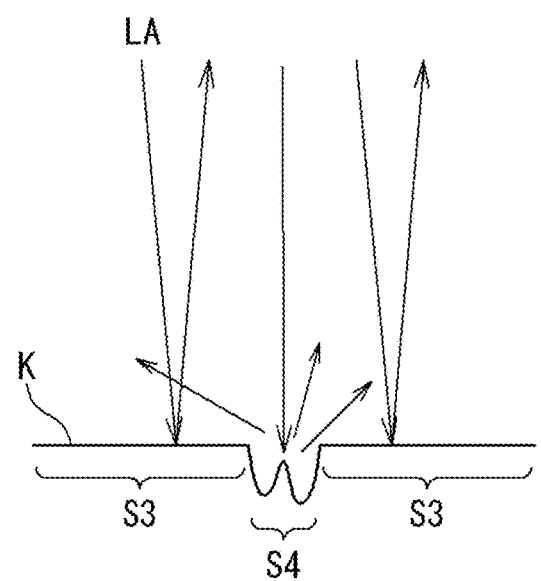
FIG. 5 is a view for describing appearance inspection to be performed by the appearance inspection apparatus with the illumination device arranged at a second position.

FIG. 5 is a view for describing appearance inspection to be performed with the illumination device 10 arranged at the second position. Referring to FIG. 5, the light LA that is diffused from the illumination device 10 located at the second position and is specularly reflected by the inspection surface K enters the camera 20. In a range S4 with irregularities such as a flaw on the inspection surface K, the degree of specular reflection is lower and the degree of diffuse reflection is higher than those in a range S3 without irregularities such as a flaw. Therefore, the intensity of light that enters the camera 20 from the range S4 is lower than the intensity of light that enters the camera 20 from the range S3. That is, the image captured by the camera 20 is whitish (light) in the range S3 and is blackish (dark) in the range S4. By locating the illumination device 10 at the second position, the range S3 and the range S4 can be detected based on the difference in the intensity between the light that is specularly reflected from the range S3 to enter the camera 20 and the light that is specularly reflected from the range S4 to enter the camera 20. That is, irregularities such as a flaw on the inspection surface K can be detected.

It is preferred that the illumination device 10 be further moved by the movement device 30 to a position of a height HC (third position) from the inspection surface K. The height HC is smaller than the height HB (HC<HB). Therefore, light LC that is radiated from the illumination device 10 and is specularly reflected by the inspection surface K does not enter the camera 20.

Figure 6:
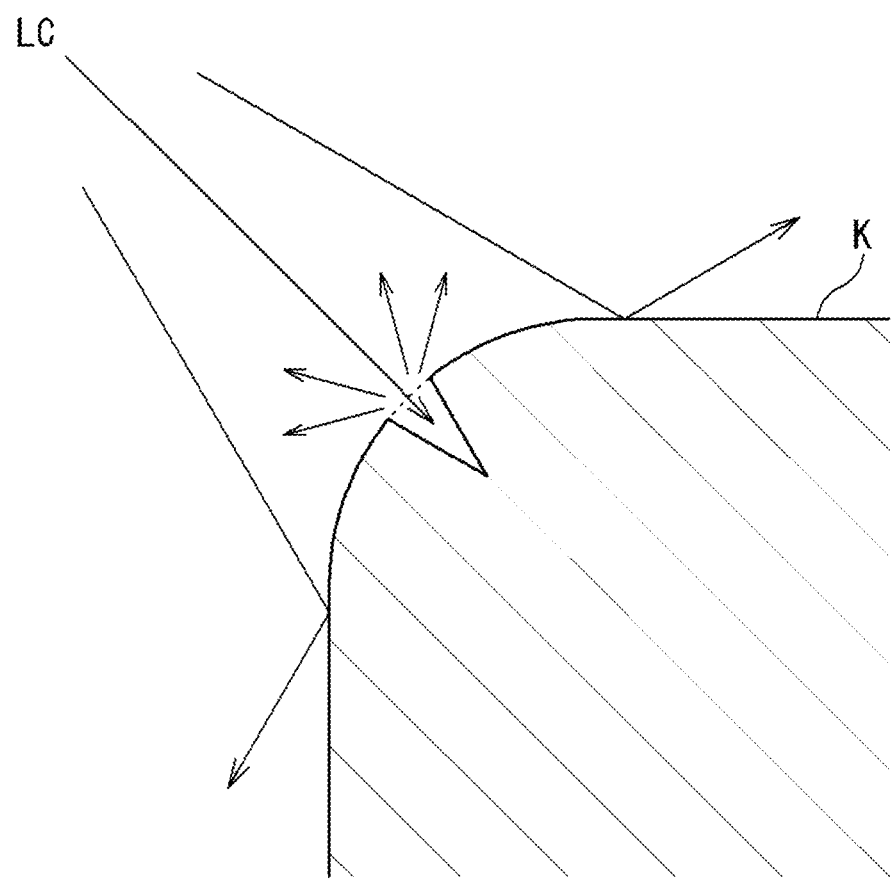
FIG. 6 is a view for describing appearance inspection to be performed by the appearance inspection apparatus with the illumination device arranged at a third position.

FIG. 6 is a view for describing appearance inspection to be performed with the illumination device 10 arranged at the third position. Referring to FIG. 6, the light LC radiated from the illumination device 10 located at the third position is radiated to a corner formed by the end face of the rolling bearing 300 (for example, the end face of the inner ring 302) that is the inspection surface K and a flat surface that is continuous with the end of the inspection surface K in the x direction and extends in the y direction. In general, the corner of the rolling bearing is chamfered (smoothed by cutting the corner with an angle or into a round shape). When the chamfered corner has no defect on its surface, the radiated light LC is mostly specularly reflected at the corner, and the reflected light does not enter the camera 20. When the corner has irregularities such as a flaw or chipping on its surface as illustrated in FIG. 6, the radiated light LC that is diffusely reflected enters the camera 20. Therefore, the image captured by the camera 20 is whitish (light) at the chipped portion. By locating the illumination device 10 at the third position, irregularities such as a flaw or chipping at the corner of the rolling bearing 300 can be detected based on the light that is reflected from the corner to enter the camera 20.

The movement device 30 moves the illumination device 10 to any one of the first position to the third position in accordance with the control performed by the PC 500. In the appearance inspection apparatus 100 according to this embodiment, the illumination device 10 is located at the first position during inspection for a difference in surface roughness such as a shoe mark, which is caused by contact between a surface and an object, at the second position during inspection for irregularities such as a flaw, and at the third position during inspection for irregularities such as a flaw or chipping at a corner. Thus, there is no need to use different appearance inspection apparatuses for a plurality of types of appearance inspection. Accordingly, a plurality of types of appearance inspection can easily be performed by using the single appearance inspection apparatus 100.

Figure 7:
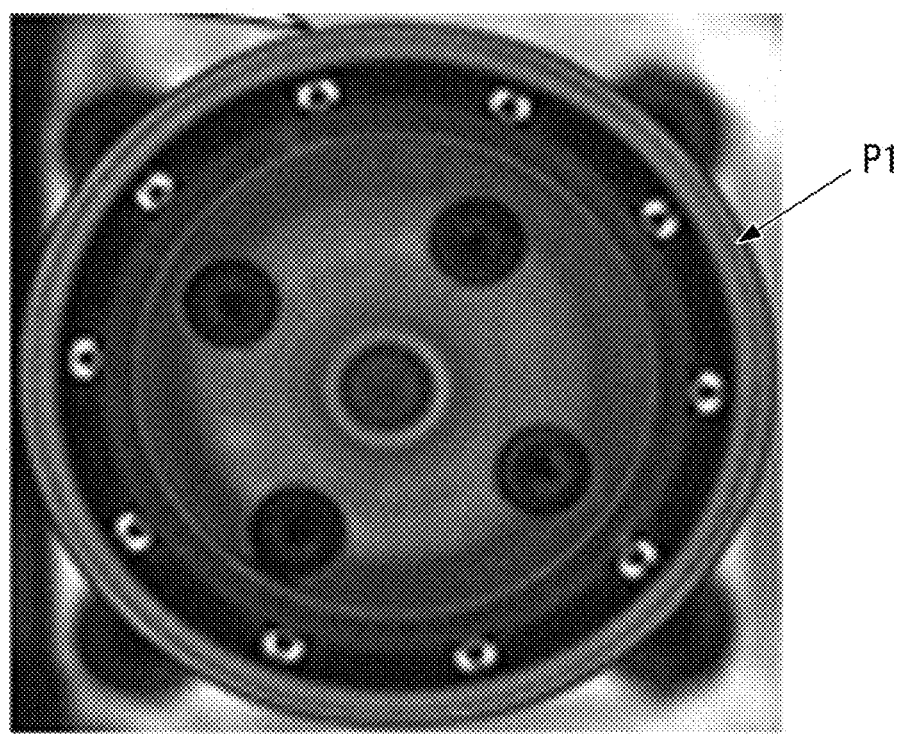
FIG. 7 is an image captured by photographing an inspection surface by the appearance inspection apparatus.

FIG. 7 is an image captured by photographing the inspection surface K that is the end face of each of the outer ring 301 and the inner ring 302 of the rolling bearing 300 with the camera 20 while the illumination device 10 is located at the first position. Referring to FIG. 7, the image captured by the appearance inspection apparatus 100 clearly shows a black line P1 on the end face of the outer ring 301. The line P1 indicates a shoe mark that is present on the end face of the outer ring 301. In the appearance inspection apparatus 100, the contrast of the color density of the captured image is increased by photographing the inspection surface K with the camera 20 while the illumination device 10 is located at the first position. Therefore, the captured image clearly shows a difference in the color density between a range with a large surface roughness of the inspection surface K due to a shoe mark or the like and a range with a small surface roughness of the inspection surface K.

For example, the CPU 50 of the PC 500 executes analysis processing to analyze the color density, that is, the lightness of the captured image (FIG. 7) from the camera 20. In this manner, the presence of a shoe mark on the inspection surface K can be detected. The presence of a shoe mark may be detected through a user's visual check to be conducted by displaying the captured image on a display (not illustrated) of the PC 500.

Figure 8:
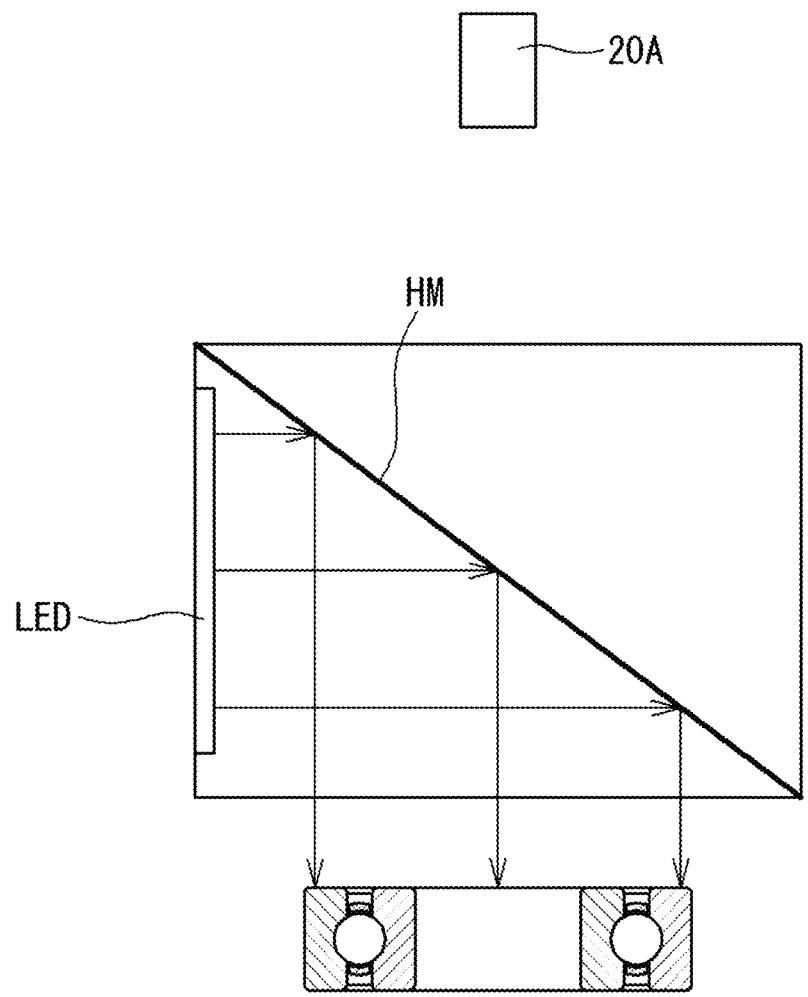
FIG. 8 is a schematic view illustrating a related-art appearance inspection apparatus.
Figure 9:
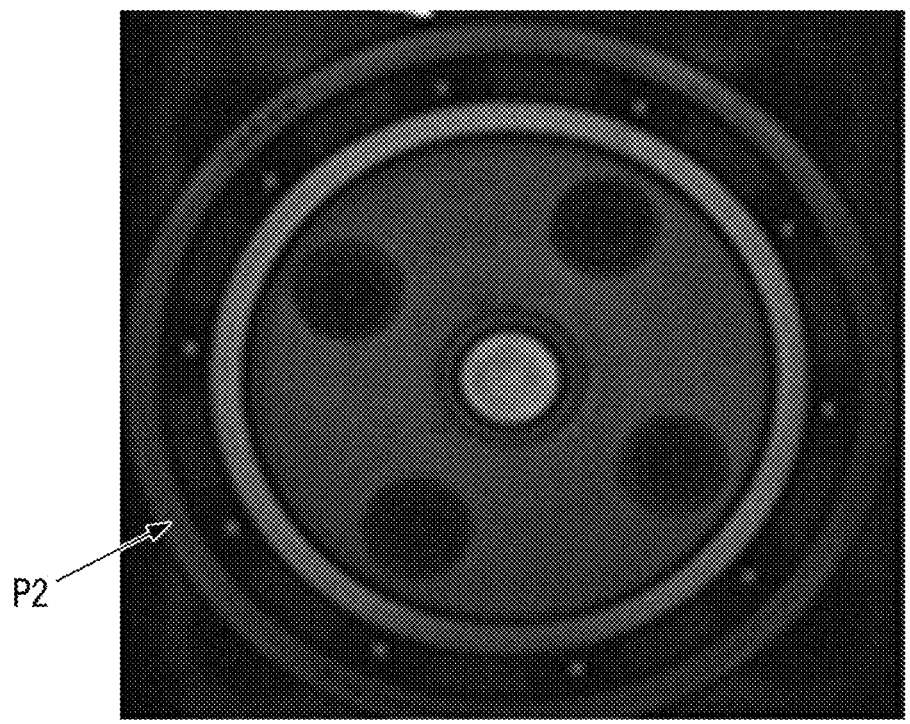
FIG. 9 is an image captured by photographing the inspection surface by the related-art appearance inspection apparatus.
Figure 10:
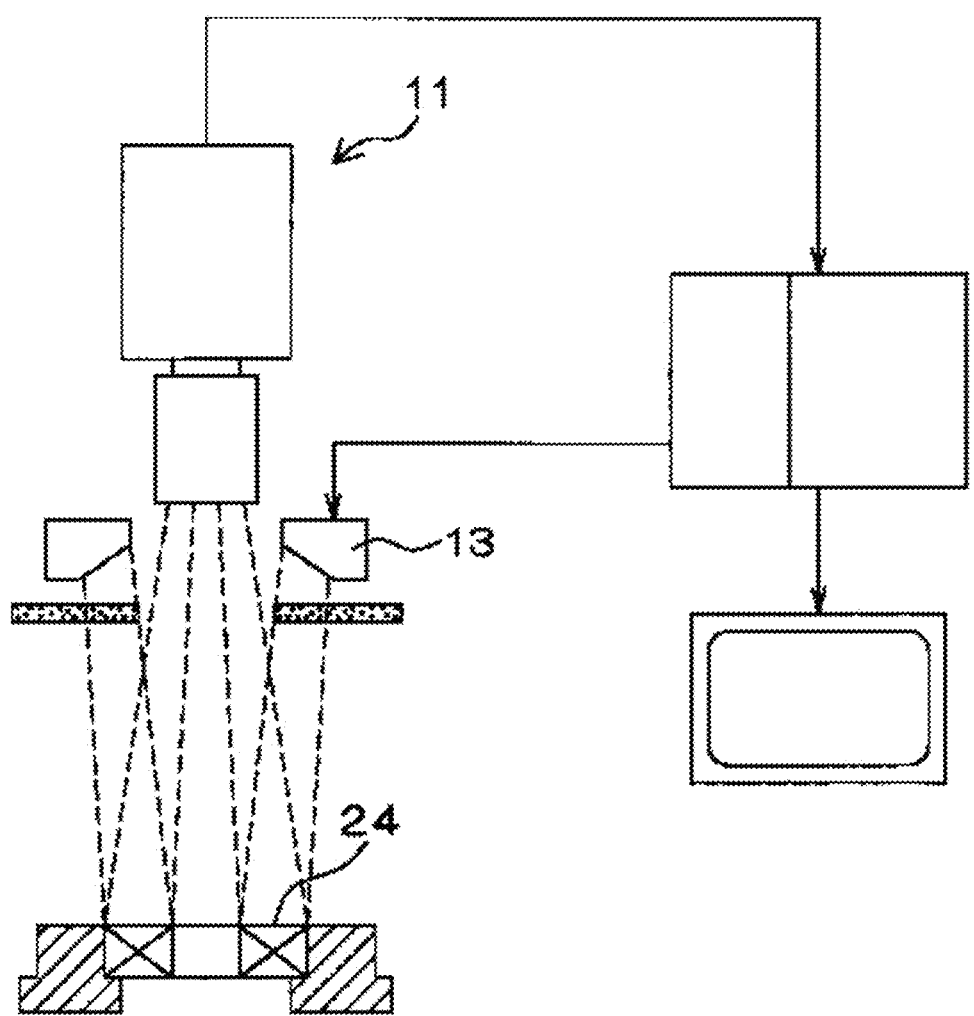
FIG. 10 is a schematic view illustrating another related-art appearance inspection apparatus.

Effects of the first embodiment are described below. Effects of the appearance inspection performed by the appearance inspection apparatus 100 according to this embodiment are verified through comparison to a result of inspection performed by a related-art appearance inspection apparatus. FIG. 8 is a schematic view of the structure of the related-art appearance inspection apparatus used in the comparison. FIG. 9 is an image captured by the related-art appearance inspection apparatus as a result of inspection. The image in FIG. 9 is captured under conditions that the same rolling bearing as that in the captured image in FIG. 7 is the subject of photographing and the same surface as that in the captured image in FIG. 7 is the inspection surface K.

Referring to FIG. 8, the related-art appearance inspection apparatus uses an illumination device configured to radiate, for example, LED light having a high directivity than the diffused light. An LED and a camera 20A are arranged so as to have a positional relationship in which light that is specularly reflected by the inspection surface enters the camera 20A. Therefore, the direction of radiation from the LED may be adjusted by using, for example, a half-silvered mirror HM as illustrated in FIG. 8.

Referring to FIG. 9, a line P2 that is present on the image captured by the related-art appearance inspection apparatus and corresponds to the line P1 in FIG. 7 is not as clear as the line P1 in FIG. 7. This is because the entire captured image in FIG. 9 has a low contrast of the color density. That is, comparing FIG. 7 and FIG. 9, the image in FIG. 7 has a high contrast of the color density to clearly show the shoe mark on the inspection surface K. By using the difference in the intensity of the diffusely reflected light that enters the camera 20 while setting the positional relationship between the camera 20 and the light source 10A to the first positional relationship, the difference in the surface roughness of the inspection surface K is clearly shown as the difference in the color density of the captured image. Thus, the defect on the inspection surface K that is the difference in the surface roughness such as a shoe mark can be detected with high accuracy.

In the appearance inspection apparatus 100 according to this embodiment, the illumination device 10 can be shifted between the first position and the second position. Therefore, the positional relationship between the camera 20 and the light source 10A can easily be changed between the first positional relationship and the second positional relationship. Thus, both of the appearance inspection for detecting the presence or absence of irregularities on the inspection surface K by using the difference in the intensity of the light that is specularly reflected to enter the camera 20 and the appearance inspection for detecting the difference in the surface roughness of the inspection surface K by using the difference in the intensity of the light that is diffusely reflected to enter the camera 20 can be achieved by the single appearance inspection apparatus 100 without using different appearance inspection apparatuses suited to the respective types of inspection. The positional relationship between the camera and the light source can be changed even in a case of bearings having a different diameter or height. That is, the single apparatus is adaptable to various types of bearing.

It is preferred that the illumination device 10 of the appearance inspection apparatus 100 according to this embodiment be further movable to the third position. Thus, the appearance inspection apparatus 100 enables not only the inspection for a defect on the inspection surface K but also the inspection for a defect on the surface of the corner formed by the inspection surface K and the flat surface that is continuous with the end of the inspection surface K in the x direction and extends in the y direction.

A second embodiment is described below. In the example described above, the position of the camera 20 is fixed and the illumination device 10 is moved by the movement device 30, thereby changing the positional relationship between the camera 20 and the light source 10A. To change the positional relationship, it is only necessary to move at least one of the camera 20 and the illumination device 10. Therefore, the present invention is not limited to the structure in which only the illumination device 10 is moved. As another example, the camera 20 may be movable in the y direction by the movement device 30. In this case, the camera 20 is movable between a first position and a second position by the movement device 30. The first position is a position of the camera 20 where the positional relationship between the camera 20 and the light source 10A is the first positional relationship. The second position is a position of the camera 20 where the positional relationship between the camera 20 and the light source 10A is the second positional relationship.

A third embodiment is described below. In the example described above, the camera 20 is arranged on the straight line including the central axis C of the rolling bearing 300 so as to be oriented in the −y direction. Thus, when the area of the entire end face of the rolling bearing 300 falls within the photographing range, the entire end face of the rolling bearing 300 that is the inspection surface K oriented in the +y direction can be photographed with good balance at once (so that the end face is located at the center of the captured image). The camera 20 may be located at any position as long as the positional relationship between the camera 20 and the light source 10A is the first positional relationship or the second positional relationship and the inspection surface K falls within the photographing range.

When the inspection surface K is wider than the photographing range of the camera 20, the appearance inspection apparatus 100 may further include a device for moving (rotating) the rolling bearing 300. The camera 20 may photograph a plurality of times the inspection surface K included in the end face of the rolling bearing 300 that is being moved (rotated) by that device.

When the appearance of the opposite end face (oriented in the −y direction) of the rolling bearing 300 is inspected, it is only necessary to invert the rolling bearing 300 in the y direction. The appearance inspection apparatus 100 may further include a device for inverting the rolling bearing 300 in the y direction.

A fourth embodiment is described below. In the example described above, the light source 10A has a shape of a ring that is defined about a point included in the straight line including the central axis C of the rolling bearing 300 and is included in a plane parallel to the end face of the rolling bearing 300. This shape can reduce a possibility that the illumination device 10 is located in the photographing range of the camera 20 or the shadow of the camera 20 is cast over the photographing range. As a result, the degree of freedom of arrangement of the illumination device 10 and the camera 20 can be increased.

The shape of the light source 10A is not limited to the ring shape. For example, a planar shape (planar light source) or other shapes may be employed instead. In this case, the illumination device 10 and the camera 20 are arranged so as to have the first positional relationship or the second positional relationship. Further, it is necessary to arrange the illumination device 10 and the camera 20 so as to have a positional relationship in which the illumination device 10 is not located in the photographing range of the camera 20. It is also necessary to arrange the illumination device 10 and the camera 20 so as to have a positional relationship in which the shadow of the camera 20 is not cast over the photographing range.

It should be understood that the embodiments disclosed herein are illustrative but are not limitative in all respects. The scope of the present invention is defined by the claims rather than the description above, and is intended to encompass meanings of equivalents to the elements in the claims and all modifications within the scope of the claims.

According to the present invention, the accuracy of appearance inspection can be improved.

What is claimed is:

1. An appearance inspection apparatus comprising:
a photographing device configured to photograph a flat inspection surface of an object to be inspected;
an illumination device configured to radiate light from a light source to the inspection surface as diffused light, the photographing device and the light source being arranged in a first positional relationship; and
a movement device configured to move at least one of the photographing device and the light source, such that a positional relationship between the photographing device and the light source is changed from the first positional relationship to a second positional relationship different from the first positional relationship, the movement device including a rail and a drive unit, wherein:

in the first positional relationship, a first angle formed between a straight line connecting an arbitrary position on the inspection surface to the photographing device and a line normal to the inspection surface is different than a second angle formed between a straight line connecting the arbitrary position to the light source and the line normal to the inspection surface, and the straight line connecting the arbitrary position to the photographing device is along a line of reflected light reflected at the arbitrary position on the inspection surface, and in the second positional relationship, the first angle is the same as the second angle, and a first height in the direction of the line normal to the inspection surface between an arbitrary position on the inspection surface and the photographing device is longer than a second height in the direction of the line normal to the inspection surface between the arbitrary position on the inspection surface and the light source.

2. The appearance inspection apparatus according to claim 1, wherein:
the object to be inspected is a rolling bearing including an inner ring and an outer ring,
the inspection surface is an end face of each of the outer ring and the inner ring, the inspection surface being orthogonal to a rotation axis of the rolling bearing,
the photographing device is arranged along the rotation axis of the rolling bearing, and
the light source has a shape of a ring defined about a point located on the rotation axis of the rolling bearing.

3. An appearance inspection method for an object to be inspected using an image captured by photographing a flat inspection surface of the object to be inspected with a photographing device, the appearance inspection method comprising:
radiating light from a light source to the inspection surface as diffused light with an illumination device;
photographing the inspection surface, which is irradiated with the diffused light, with the photographing device and the light source being arranged in a first positional relationship;
moving at least one of the photographing device and the light source, such that a positional relationship between the photographing device and the light source is changed from the first positional relationship to a second positional relationship different from the first positional relationship; and
photographing the inspection surface, which is irradiated with the diffused light, with the photographing device and the light source being arranged in the second positional relationship,
wherein:
in the first positional relationship, a first angle formed between a straight line connecting an arbitrary position on the inspection surface to the photographing device and a line normal to the inspection surface is different than a second angle formed between a straight line connecting the arbitrary position to the light source and the line normal to the inspection surface, and the straight line connecting the arbitrary position to the photographing device is along a line of reflected light reflected at the arbitrary position on the inspection surface, and
in the second positional relationship, the first angle is the same as the second angle.

4. An appearance inspection method for an object to be inspected using an image captured by photographing a flat inspection surface of the object to be inspected with a photographing device, the appearance inspection method comprising:
    radiating light from a light source to the inspection surface as diffused light with an illumination device;
    photographing the inspection surface, which is irradiated with the diffused light, with the photographing device and the light source being arranged in a first positional relationship;
    moving at least one of the photographing device and the light source, such that a positional relationship between the photographing device and the light source is changed from the first positional relationship to a second positional relationship different from the first positional relationship; and
    photographing the inspection surface, which is irradiated with the diffused light, with the photographing device and the light source being arranged in the second positional relationship,
wherein:
    in the first positional relationship, a first angle formed between a straight line connecting an arbitrary position on the inspection surface to the photographing device and a line normal to the inspection surface is the same as a second angle formed between a straight line connecting the arbitrary position to the light source and the line normal to the inspection surface, and the straight line connecting the arbitrary position to the photographing device is along a line of reflected light reflected at the arbitrary position on the inspection surface, and
    in the second positional relationship, the first angle is different than the second angle.

5. The appearance inspection apparatus according to claim 1, wherein a first difference between the first height and the second height in the first positional relationship is larger than a second difference between the first height and the second height in the second relationship.

* * * * *